(12) United States Patent
Hagemann

(10) Patent No.: US 11,668,379 B2
(45) Date of Patent: Jun. 6, 2023

(54) SPINDLE DRIVE HAVING A REVERSE-LOCK TRANSMISSION

(71) Applicant: D+H MECHATRONIC AG, Ammersbek (DE)

(72) Inventor: Ralf Hagemann, Rosengarten (DE)

(73) Assignee: D+H MECHATRONIC AG, Ammersbek (DE)

( * ) Notice: Subject to any disclaimer, the term of this patent is extended or adjusted under 35 U.S.C. 154(b) by 312 days.

(21) Appl. No.: 17/266,774

(22) PCT Filed: Aug. 7, 2019

(86) PCT No.: PCT/EP2019/071189
§ 371 (c)(1),
(2) Date: Jul. 26, 2021

(87) PCT Pub. No.: WO2020/030681
PCT Pub. Date: Feb. 13, 2020

(65) Prior Publication Data
US 2022/0178429 A1      Jun. 9, 2022

(30) Foreign Application Priority Data

Aug. 8, 2018  (DE) .......................... 202018104556.3

(51) Int. Cl.
*F16H 25/24*      (2006.01)
*E05F 15/622*     (2015.01)
(Continued)

(52) U.S. Cl.
CPC ....... *F16H 25/2454* (2013.01); *E05F 15/622* (2015.01); *E06B 3/5036* (2013.01);
(Continued)

(58) Field of Classification Search
CPC ......... F16H 2025/2075; F16H 25/2454; F16D 2041/0665; F16D 41/105; F16D 41/066; E06B 3/5036; E05F 15/622
See application file for complete search history.

(56) References Cited

U.S. PATENT DOCUMENTS 2,894,293 A * 7/1959 Singleton .............. E06B 3/5009
                                                              49/81.1
3,576,240 A * 4/1971 Nicholson .............. B60K 26/02
                                                              192/17 R
(Continued)

FOREIGN PATENT DOCUMENTS

EP        3164283       5/2017
EP        3199742       8/2017
(Continued)

*Primary Examiner* — David M Fenstermacher
(74) *Attorney, Agent, or Firm* — Sand, Sebolt & Wernow Co., LPA

(57) ABSTRACT

The invention relates to a refinement of a spindle drive (1), and to a louvered window or a louvered shutter having a spindle drive for moving louver elements such that applied return forces and return torques can be absorbed better, and in particular without placing a load on the drive motor. For this purpose, the spindle drive (1) has a specially designed return stop mechanism (6) arranged between a drive shaft of a drive motor (3) and a threaded spindle (4).

10 Claims, 3 Drawing Sheets

(51) Int. Cl.
*E06B 3/50* (2006.01)
*F16D 41/066* (2006.01)
*F16D 41/10* (2006.01)
*F16H 25/20* (2006.01)

(52) U.S. Cl.
CPC ......... *F16D 41/066* (2013.01); *F16D 41/105* (2013.01); *F16D 2041/0665* (2013.01); *F16H 2025/2075* (2013.01)

(56) References Cited

U.S. PATENT DOCUMENTS

| | | | | |
|---|---|---|---|---|
| 5,916,325 | A * | 6/1999 | Madrid | F16H 25/2021 464/37 |
| 2004/0050193 | A1* | 3/2004 | Fischbach | F16H 25/2204 74/89.39 |
| 2005/0155444 | A1 | 7/2005 | Otaki et al. | |
| 2017/0292319 | A1* | 10/2017 | Harrison | E06B 3/5036 |
| 2017/0299028 | A1* | 10/2017 | Kreutzer | B60T 13/746 |
| 2019/0032397 | A1* | 1/2019 | Sosa | E06B 3/08 |
| 2021/0355735 | A1* | 11/2021 | Hagemann | E05F 15/622 |
| 2022/0178429 | A1* | 6/2022 | Hagemann | F16D 41/105 |

FOREIGN PATENT DOCUMENTS

| | | |
|---|---|---|
| JP | 2007040343 | 2/2007 |
| JP | 2007192314 | 8/2007 |

\* cited by examiner

SPINDLE DRIVE HAVING A REVERSE-LOCK TRANSMISSION

BACKGROUND

Technical Field

The invention relates to a spindle drive for motor-driven movement of louver elements of louvered windows or louvered shutters, having a threaded spindle that can be driven in a rotary manner by a drive motor and a spindle nut which is in engagement with the threaded spindle, and which can be displaced axially along the threaded spindle by rotating the threaded spindle. It relates to a louvered window or a louvered shutter with a spindle drive for moving louver elements.

Background Information

Spindle drives are known in very different applications. They are generally used to convert a rotary drive movement into a linear movement. In addition to manual spindle drives, in particular motor-driven spindle drives are used, wherein such motor-driven spindle drives are the subject matter of the present invention.

Elements moved with motor-driven spindle drives often have to be held in a set position against applied loads or against a return or counterforce. For this purpose, return forces must be absorbed, which in the known spindle drives is usually achieved by inhibiting the drive motor.

One area of application of such spindle drives, on which the applicant is particularly focused, is the moving of locking elements for windows and/or shutters, in particular of louver elements of louvered windows or louvered shutters. For such components, for example louvered windows used in facades, which have two or more window louvers arranged in a frame such that they are rotatable about respective rotational axes extending parallel to each other, motor-driven spindle drives are regularly used to displace a pushing element, which pushing element is part of a gear to which the window louvers are coupled, in order to rotate the same in a synchronized manner for opening or closing the window opening.

Especially since such louvered windows are built with increasingly larger dimensions, thus causing the window louvers to have increasingly larger expansions and greater weight, and at the same time offering more contact surface for wind loads, the return forces and torques to be absorbed by the spindle drives when holding the louver elements in a non-closed position have become greater compared to previous requirements. These can often no longer be safely compensated by commonly used drive motors. Accordingly, more powerful drive motors must be used or other measures must be taken to absorb the return forces and torques.

SUMMARY

This is the problem addressed by the present invention. The problem underlying the invention is to refine a spindle drive in such a way that return forces and return torques can be absorbed better and especially without placing a load on the drive motor.

This problem is solved by a spindle drive with the features of a threaded spindle that can be driven in a rotary manner by a drive motor and a spindle nut, which is in engagement with the threaded spindle and which can be displaced axially along the threaded spindle by rotating the threaded spindle.

The spindle drive may include a return stop mechanism arranged between a drive shaft of the drive motor and the threaded spindle, having a drive element and an output element. The drive element and the output element may be arranged concentric to a rotational axis and may be rotatable about this rotational axis relative to each other by an angular range within a guide surrounding one of these two elements. The guide may have an internal surface with a circular cross-section which is located in a section plane perpendicular to the rotational axis, and which guide may also be arranged concentrically to the rotational axis. At least one radially protruding driving protrusion may be designed at a first of the elements, i.e., drive element and output element. A driving slot may be provided in a second of the elements, i.e., drive element and output element. The driving protrusion may protrude into the driving slot. The driving slot, as seen in a circumferential direction relative to the rotational axis, has a slot width which is greater by a first value than a width of the driving protrusion in the circumferential direction. At least one notch may be provided in the element having the driving protrusion, in which notch at least one rolling element may be arranged. The at least one rolling element may be arranged in a position in the notch between the inner surface of the guide and a surface of the element having the driving slot, wherein the element having the driving protrusion may have an extension of a second value, as measured from the driving protrusion to an edge of the notch facing the driving protrusion along the circumferential direction. The surface of the element having the driving slot, in a region covered by the notch in a middle section in a plane transverse to the rotational axis, extends in the shape of a circular section concentrical to the extension of the inner surface, and in this region may have a constant first distance to the inner surface. The surface of the element having the driving slot may have outer sections in the region covered by the notch, which outer sections may be positioned on respective sides of the middle section as seen in the circumferential direction, in which the surface of the element having the driving slot may deviate from the circular extension and may have a second distance to the inner surface, which is less than the first distance. The rolling elements may have a roller diameter which is smaller than or the same size as the first distance, but larger than the second distance. The second value is selected such that the element having the driving protrusion may cover the outer section located adjacent to a side surface of the driving slot, which faces the edge of the notch, when the driving protrusion comes to a stop against said side surface.

Advantageous refinements of such a spindle drive according to the invention include that the second distance in the outer sections may decrease as the distance from the middle section increases. Regarding the drive element and the output element, radially protruding driving protrusions may be designed on the first of the elements and driving slots may be designed on the second of the elements, in each case in at least two, in particular in exactly three, positions offset in the circumferential direction, wherein the respective driving protrusions may have identical dimensions and the respective driving slots may have identical dimensions. The driving protrusions and driving slots may be designed such that, in a first relative rotational position of the two elements, i.e., drive element and output element, all driving protrusions may come to a stop against first side surfaces, located on the left as seen in the rotational direction, of the corresponding driving slots, and in a second relative rotational position of the two elements, i.e., drive element and output element, which is different from the first position, all driving protrusions may come to a stop against second side surfaces, located on the right as seen in the rotational direction, of the corresponding driving slots. Respective notches with the features specified earlier herein may be provided in the respective regions in between the driving protrusions in the element having the driving protrusions, and at least one rolling element may be arranged in each of the notches. Multiple, in particular two, rolling elements may be provided in the at least one notch, which are arranged side by side as seen in the circumferential direction. Furthermore, the threaded spindle may be firmly connected to the output element, in particular may be integrally formed with the same, and in the driven state may rotate about the rotational axis. The region of the surface of the element having the driving slot, which is covered by the notch may have a form symmetrical to a central axis, as seen in a cross-section plane perpendicular to the rotational axis. In a further aspect, the invention also specifies a louvered window or a louvered shutter, which has a spindle drive as indicated by this invention for moving its louver elements.

According to the invention, a spindle drive, which particularly, but not exclusively, can be used for the motor-driven movement of louver elements of louvered windows or louvered shutters, has a drive motor and a threaded spindle which can be driven in a rotary manner by the former. Furthermore, a spindle nut, which is in engagement with the threaded spindle and which can be displaced axially along the threaded spindle by rotating the threaded spindle, is part of the spindle drive. Such a spindle drive—generally known with the aforementioned features—is now provided according to the invention with a return stop mechanism arranged between a drive shaft of the drive motor and the threaded spindle. This return stop mechanism serves to prevent a return force or a return torque bearing on the spindle nut and transferred to the threaded spindle from being fed back into the drive motor. The return stop mechanism therefore decouples the drive motor from such a return force or such a return torque, such that this force or this torque can be transferred via, for example, a housing section, to which the return stop mechanism is firmly attached, to such a housing and other structures connected to the housing, and can be absorbed there.

The return stop mechanism according to the invention is in particular effective bidirectionally, i.e., it locks both against a force acting via the threaded spindle in the direction of the drive motor or a torque in a left-rotating direction of the threaded spindle, as well as in a right-rotating direction of the threaded spindle.

The return stop mechanism according to the invention is formed with the following elements and designed as follows:

It has a drive element and an output element. The drive element and the output element are arranged concentric to a rotational axis and rotatable about this rotational axis relative to each other by an angular range within a guide surrounding one of these two elements, which guide has an internal surface having a circular cross-section which is located in a section plane perpendicular to the rotational axis, and which guide is also arranged concentrically to the rotational axis. The rotational axis can, for example, coincide with the longitudinal and rotational axis of the threaded spindle. It may also be arranged offset to the same, if a further gear arrangement is connected to the output element of the return stop mechanism, with which further gear arrangement the rotary drive and the torque is finally transferred to the threaded spindle. Furthermore, at least one radially protruding driving protrusion is designed on a first of the elements, i.e., drive element and output element, in the return stop mechanism of the spindle drive according to the invention, and a driving slot is provided in a second of the elements, i.e., drive element and output element. In particular, the drive element therein can have the driving protrusion, and the output element can have the driving slot. The driving protrusion protrudes into the driving slot, such that the two elements, i.e., drive element and output element, are thereby rotatably coupled with each other. The driving slot, as seen in a circumferential direction relative to the rotational axis, has a slot width which is greater by a first value than a width of the driving protrusion in the circumferential direction. This results in an angular clearance between the two elements, i.e., drive element and output element, enabling a relative rotation of the two elements to each other, which clearance is determined by this first value.

Furthermore, at least one notch is provided in the element having the driving protrusion, for example, the drive element, in which notch at least one rolling element is arranged, which is arranged in a position in the notch between the inner surface of the guide and a surface of the element having the driving slot, for example the output element. Such a rolling element can be, for example, a ball, a cylindrical roller, a tapered roller, or a similar known rolling element.

Furthermore, according to the invention, the element having the driving protrusion has an extension of a second value, as measured from the driving protrusion to an edge of the notch facing the driving protrusion along the circumferential direction. This arrangement thus forms an "arm", which is displaced during a relative movement of the drive element and the output element by rotating relative to each other along the surface of the element having the driving slot, and which can either cover or expose the surface in this region depending on the position of the two elements relative to each other.

Furthermore, the surface of the element having the driving slot, in a region covered by the notch in a middle section in a plane transverse to the rotational axis, extends in the shape of a circular section concentrical to the extension of the inner surface, and in this region has a constant first distance to the inner surface. The phrase "region covered by the notch" herein describes a region of the surface of the element having the driving slot, which region in any case is in one of the possible positions between the output element and the drive element rotated relative to each other below the notch, as seen in the radial direction.

Furthermore, the surface of the element having the driving slot has outer sections in the region covered by the notch, which outer sections are positioned on both sides of the middle section in the circumferential direction, in which the surface of the element having the driving slot deviates from the circular extension and has a second distance to the inner surface, which is less than the first distance. The rolling element has a roller diameter that is smaller than or the same size as the first distance, but larger than the second distance. Due to this, the rolling element, if it is located in the middle section, can move freely and does not impede a relative movement between the drive element and the output element, nor a rotation of the two elements together relative to the guide. However, if the rolling element is located in one of the outer sections, the reduction of the distance between the surface of the element having the driving slot and the inner surface of the guide of the rolling elements results in a wedging of the rolling element, which prevents a further rotation of the system (the two elements together, i.e., drive element and output element, relative to the guide). This circumstance is now used to block the return stop mechanism when the drive motor is not running, i.e., when the spindle drive is not moved, but a return torque or a return force is applied. This is possible because the aforementioned situation leads to a rotation of the output element and thus to a relative displacement in such a way that the at least one rolling element is pushed into one of the outer sections, where it locks up. However, to unlock the return stop mechanism in the case of a desired drive, it is provided that the element having the driving protrusion covers the outer section located adjacent to a side surface of the driving slot, which faces the edge of the notch, when the driving protrusion comes to a stop against said side surface. Thus, the rolling element is then prevented from entering this section and is then "carried along" by the driven element in the middle section, without causing a clamping effect.

The specially designed return stop mechanism of the spindle drive according to the invention, as described above, is characterized in particular in that it does not require active additional actuators, in that no springs or other tensioning elements are required, but in that it is designed with few components and very robustly, and at the same time ensures a very reliable locking effect against return forces or return torques. If, for example, the guide is rigidly connected in this manner to components which can bear corresponding loads and which can absorb the return forces or return torques, these forces and torques are transferred accordingly to such components via the return stop mechanism without placing a load on the drive motor.

A return stop mechanism integrated in the spindle drive in a manner according to the invention especially is advantageous if the spindle drive is intended to be installed in a window or a shutter, in particular a louvered window or a louvered shutter, for moving vane or louver elements. This is because the spindle drive in this case offers a particularly good protection against prying open the vane or louvered elements, i.e., a good burglar protection, thanks to the strong self-locking effect achieved by its return stop mechanism.

Another advantage over previously known spindle drives, in which threaded spindles with a low efficiency are often used to achieve a required strong self-locking effect, lies in having another option of designing and dimensioning the spindle drive. Where, in the known spindle drives with low efficiency, upstream motor-gear units have to deliver more power and accordingly have to be dimensioned larger, the return stop mechanism provided according to the invention allows for the use of threaded spindles with high efficiency, which in turn facilitate savings in size and cost of the motor-gear unit. As a result of making higher energy efficiencies achievable, power supplies for transforming the mains voltage down to a safety low voltage of the motor, which are usually integrated in the drive or are located outside the drive, can be dimensioned smaller and are thus more cost-effective. This also applies to power supply cables and electronic/electromechanical components, as well as to standby power supply systems.

In the design according to the invention, the drive element can, for example, be arranged on the outside of and around the output element, i.e., located towards the guide. As mentioned previously, the drive element can then have the driving protrusion(s), and the output element can have the driving slot(s).

It is particularly advantageous if the second distance in the outer sections can decrease as the distance from the middle section increases. This leads to a kind of wedge-shaped extension of the increasingly tapered space between the surface of the element having the catching slot(s) and the inner surface of the guide, and thus to an increasing clamping and wedging effect in the case of a further rotation of the combination of drive element and output element relative to the guide. Thus, the clamping effect increases as larger return forces are applied, which leads to a further reliably increased locking effect.

Furthermore, it may advantageously be provided that, regarding the drive element and the output element, radially protruding driving protrusions are designed on the first of the elements and driving slots are designed on the second of the elements, in each case in at least two, in particular in exactly three, positions offset in the circumferential direction, wherein the respective driving protrusions have identical dimensions and the respective driving slots have identical dimensions, and said driving protrusions and driving slots are designed such that, in a first relative rotational position of the two elements, i.e., drive element and output element, all driving protrusions come to a stop against first side surfaces, located on the left as seen in the rotational direction, of the corresponding driving slots, and in a second relative rotational position of the two elements, i.e., drive element and output element, which is different from the first position, all driving protrusions come to a stop against second side surfaces, located on the right as seen in the rotational direction, of the corresponding driving slots, wherein respective notches with the features specified above are provided in the respective regions in between the driving protrusions in the elements having the driving protrusions, and that at least one rolling element is arranged in each of the notches. Such a design with multiple combinations of driving protrusion and driving slot, which are arranged such that they are evenly spaced across the circumference, leads to a more even distribution of forces to be transferred and reduces the load on the structure, and allows for a smaller dimensioned design which can still transfer high torques and absorb high return forces or return torques.

It is advantageous if multiple, in particular two, rolling elements are provided in the at least one notch, which are arranged side by side as seen in the circumferential direction. Such a design makes it possible to achieve an even better clamping effect in the locking state of the return stop mechanism. Furthermore, the threaded spindle advantageously can be firmly connected to the output element, in particular may be integrally formed with the same, and in the driven state rotate about the rotational axis. This design is simple, requires few components, and is also robust.

Furthermore, it may advantageously be provided in the spindle drive according to the invention that the region of the surface of the element having the driving slot, which is covered by the notch, has a form symmetrical to a central axis, as seen in a cross-section plane perpendicular to the rotational axis. This ensures that the return stop mechanism behaves the same way in both rotational directions, i.e., has the same locking and transfer characteristics.

In a further aspect of the invention, a louvered window or a louvered shutter is specified, which, in a commonly used manner, has louver elements arranged rotatably about parallel rotational axes in a shared frame and has a drive gear, which drive gear has a pushing element connected to the louver elements for converting a longitudinal movement into rotational movements of the louver elements about their rotational axes. The louvered window according to the invention or the louvered shutter according to the invention is characterized in that it has a spindle drive of the type described above, the spindle nut of which is coupled with the pushing element for driving the pushing element.

BRIEF DESCRIPTION OF THE SEVERAL VIEWS OF THE DRAWINGS

Further advantages and features of the invention will be apparent from the following description of a preferred exemplary embodiment on the basis of the attached drawings. These show.

DETAILED DESCRIPTION

The drawings show a possible exemplary embodiment of a spindle drive according to the invention, which has a return stop mechanism designed in a manner according to the invention and which can be used in the manner according to the invention in a louvered window or a louvered shutter for driving the movement of the louver elements (window louvers or shutter louvers). The drawings are not to be considered as complete design drawings and generally are not to scale. Rather, they represent schematic diagrams, which, however, represent a more detailed representation in those aspects which show essential elements according to the invention.

Figure 1:
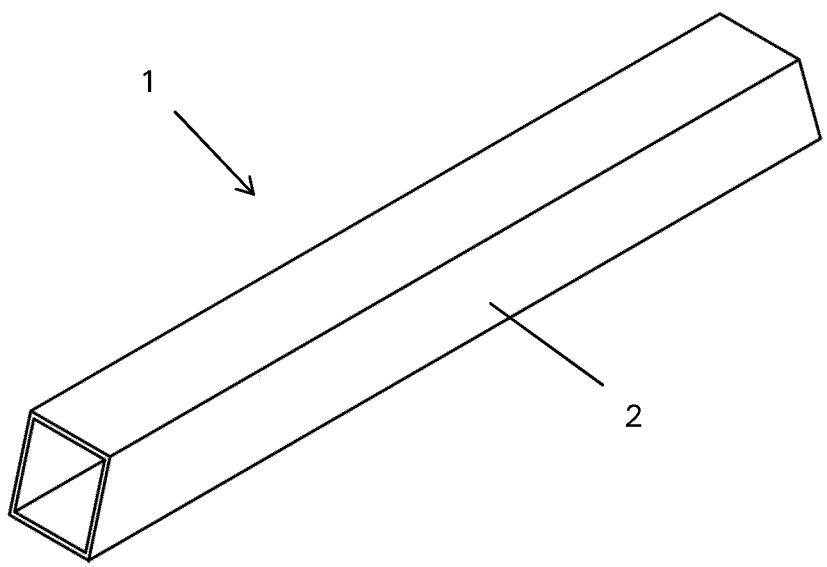
FIG. 1 A three-dimensional view of an exemplary embodiment of a spindle drive according to the invention.
Figure 2:
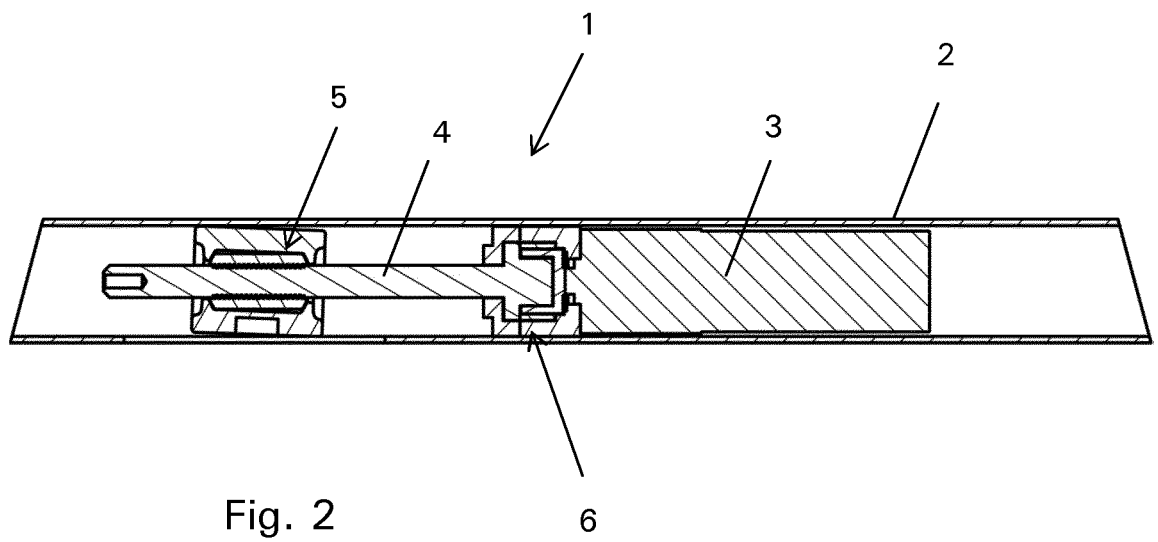
FIG. 2 A longitudinal sectional view of the spindle drive shown in FIG. 1.
Figure 3:
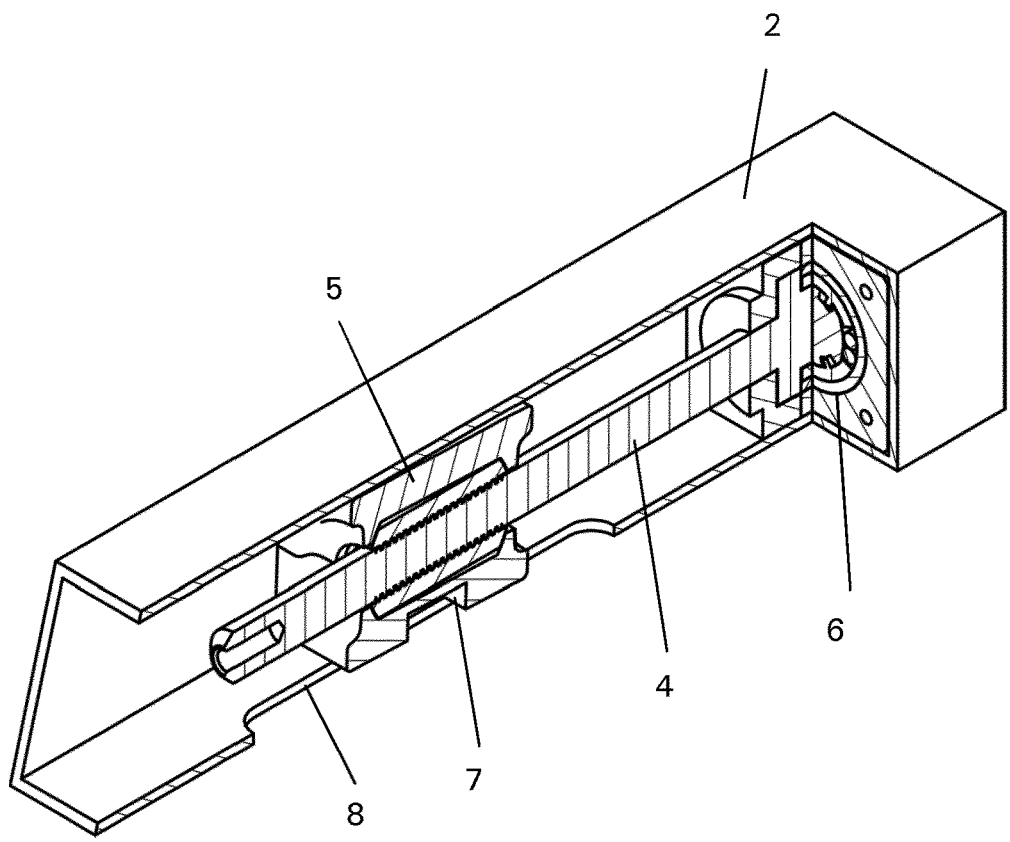
FIG. 3 A partial, three-dimensional cutaway view of a section of the spindle drive.

In the drawings, a spindle drive according to the invention in the embodiment shown there is marked with the reference numeral 1. The spindle drive 1 has an elongated, tubular, cross-sectionally rectangular drive housing 2, in which the essential elements for the operation and function of the spindle drive 1 are arranged. These essential elements are a drive motor 3, a threaded spindle 4 connected to the drive motor 3, optionally via an intermediate transfer gear, for rotationally driving said threaded spindle 4, and a spindle nut 5 with an internal thread formed inside of it, which moves on an external thread of the threaded spindle 4. The spindle nut 5 has a connection option for connecting to an element, so as to drive said element and thus moving it in a linear manner. Here, this connection option is formed by a recess 7 in the spindle nut 5, in which a cam-like protrusion formed at an element to be moved can be inserted and there can be held in a positive locking manner to be driven in a longitudinal direction. Therein, the spindle nut 5 is formed in such a way that it has an outer cross-section approximately corresponding to the inner cross-section of the drive housing 2, such that it is guided by the drive housing 2. It is particularly apparent in FIG. 3 that the drive housing 2 has a slot 8 in a section, which slot extends in a longitudinal direction of the drive housing 2 and through which the previously described connection of an element to be moved can be guided, after which said element can be fastened in the recess 7 in the spindle nut 5. The driving of the element to be moved, which is connected with the spindle nut 5 in this manner, can then be conducted across the length of the slot 8, driven by the spindle drive 2.

In this general design, the spindle drive 1 according to the invention corresponds to the basic design of commonly used and well-known spindle drives, as they are used in many application areas to convert a motorically generated rotational force into a linear movement.

The special aspect of the spindle drive 1 according to the invention is the fact that a return stop mechanism 6 is arranged between a drive shaft of the drive motor 3 and the threaded spindle 4, and also the design of this return stop mechanism 6.

Figure 4:
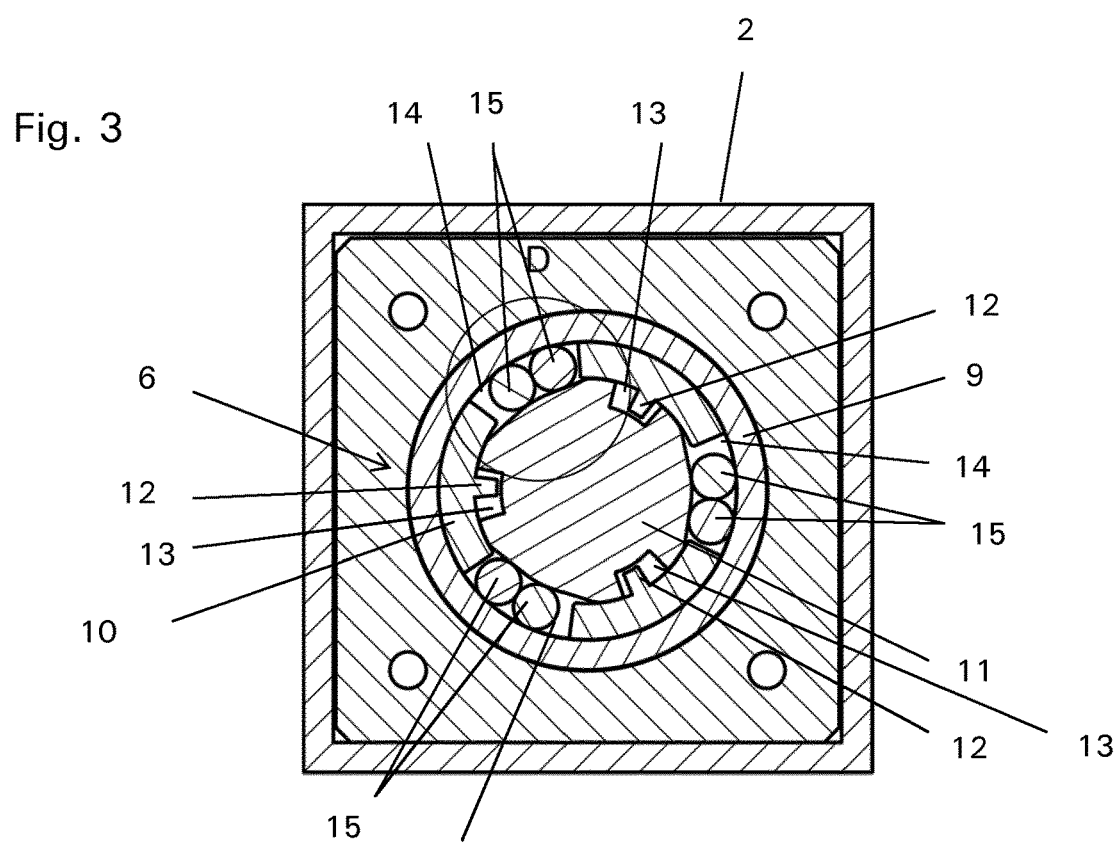
FIG. 4 A cross-section through the return stop mechanism of the spindle drive.
Figure 5:
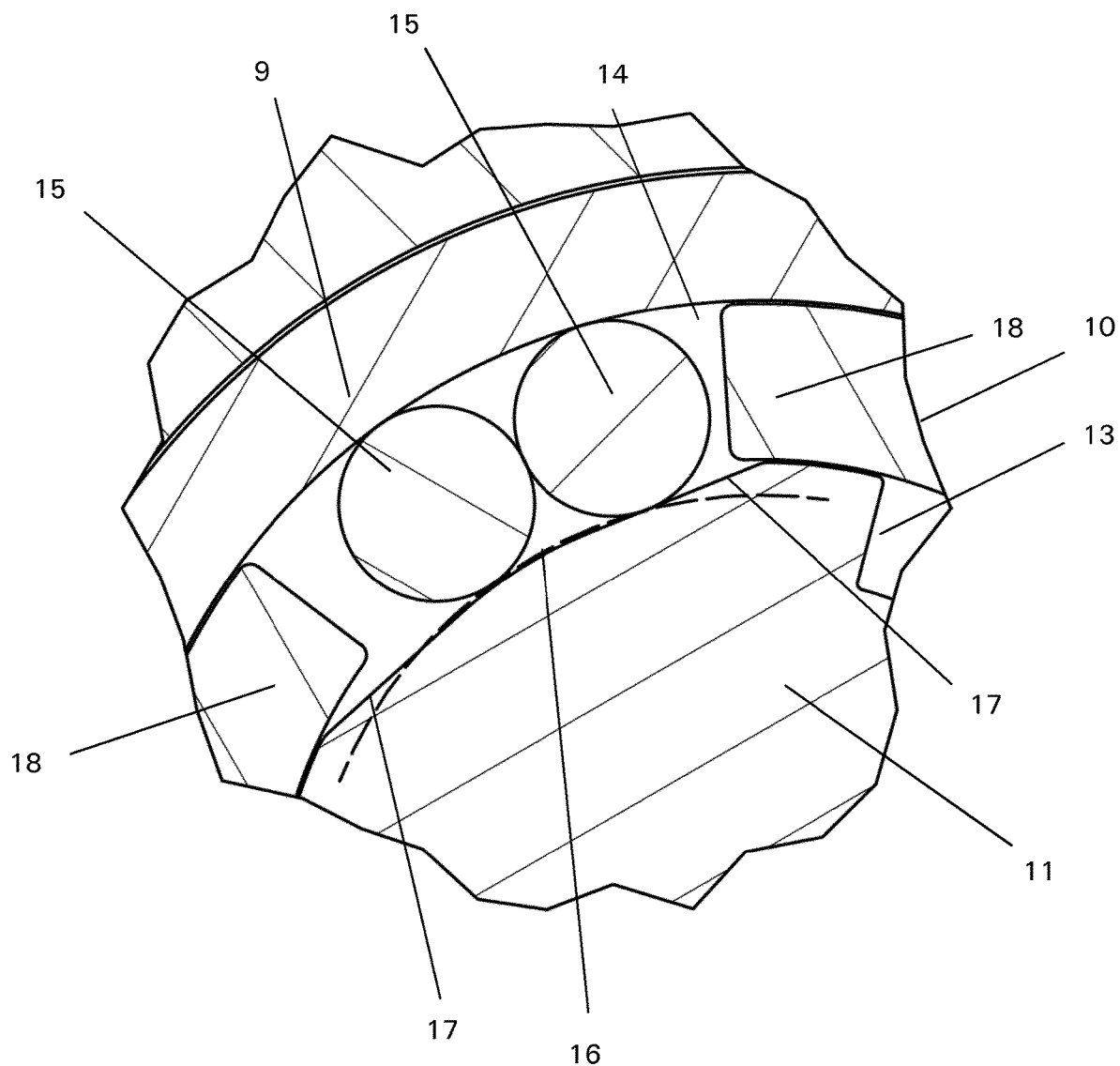
FIG. 5 An enlarged representation of the region designated with the letter D in FIG. 4.

The return stop mechanism 6 can be seen more precisely in FIGS. 4 and 5. It has as a bushing 9 as an outer enclosure, which bushing has an inner surface with a circular cross-section. Arranged in the bushing 9 and rotatable together with a circular outer surface formed with a corresponding diameter, such that it glides along the inner surface of the bushing 9, is a drive element 10, which is coupled with a drive shaft of the drive motor 3 and is driven by the drive motor 3. The drive element 10, when it is driven by the drive motor 3, rotates about a rotational axis that coincides with a central longitudinal axis of the bushing 9. This rotational axis is also the central axis of an output element 11, which (apart from a non-circular surface) is arranged concentrically to and within the drive element 10. In this exemplary embodiment, the output element 11 is an integral component of the threaded spindle 4, but can also be formed detached from the same and connected with the same via, for example, further gear elements for transferring a rotational force to the threaded spindle 4.

Radially inward protruding driving protrusions 12 are formed on the drive element 10 at three positions which are equidistant to each other and are evenly spaced along the circumference. These driving protrusions 12 protrude into driving slots 13 and thus cause a coupling between the drive element 10 and the output element 11. The driving protrusions 12 have a smaller width as seen in the circumferential direction than the slot widths of the driving slots 13 seen in the same direction. This allows for a relative rotation between the drive element 10 and the output element 11 about an angular range, which is determined by the excess of the slot widths of the driving slots 13. Therein, the driving protrusions 12 and the driving slots 13 are arranged and designed in such a manner that, in the case of a rightward rotation toward the stop position, all driving protrusions come to a stop against a right sidewall, as seen in the rotational direction, of respective associated driving slots 13, and in the case of a leftward rotation toward the stop position, all driving protrusions 12 come to a stop against a left sidewall of the respective driving slots 13.

Notches 14 are provided in regions between the driving protrusions 12 in the drive element 10, in each of which regions two rolling elements 15 are arranged.

It is apparent in FIG. 5 in particular that a surface of the output element 11, in a region which is covered by the notch 14, extends in a circular shape as seen in a cross section in a central section 16, which extension is concentric to the extension of the inner surface of the bushing 9. Thus, the surface of the output element 11 here has a constant distance to the inner surface of the bushing 9. In the outer sections 17, on the other hand, as clearly shown by the continued dashed line of the circular extension of the surface in the middle section 16, the shape of the surface differs from a circular shape, in particular is flattened, i.e., has a larger radius, resulting in a reduction of the distance from the surface of the output element 11 to the inner surface of the bushing 9. The rolling elements 15 have a roller diameter, which corresponds essentially to the distance between the surface of the output element 11 and the inner surface of the bushing 9. Thus, if the rolling elements 15 are in a position as shown for the rolling element 15 in FIG. 5 at bottom left, they can freely roll or slide between the surface of the output element 11 in the middle section 16 and the inner side of the bushing 9, such that the combination of drive element 10 and output element 11 can freely rotate relative to the bushing 9 and thus perform a rotational movement. However, if one of the rolling elements moves in the direction of one of the outer sections 17, as is the case in FIG. 5 for the rolling element 15 shown at top right, this results in a wedging of the rolling element 15 between the output element 11 and the bushing 9, such that the output element 11 cannot be rotated further relative to the bushing 9 and is blocked.

The drive element 10 has control bars 18 adjacent to, and extending to both sides of, the respective driving protrusions 12, with which it delimits the notch 14 and, depending on the relative rotational position between drive element 10 and output element 11, protrudes farther or less far into the region of the surface of the output element 11 covered by the notch 14. Therein, the control bars 18 and the outer sections 17 and the excess of the slot width of the driving slots 13 compared to the width of the driving protrusions 12 are matched to each other in such a manner that, when a rotation of the drive element 10 in a direction (clockwise or counterclockwise) causes the driving protrusions 12 to come to a stop against the respective side surfaces of the driving slots 13, which surfaces are located at the front as seen in the drive direction, thereby driving the output element 11, the control bars 18 of the drive element 10, which are in front as seen in the rotational direction, cover the respective outer sections 17 located in the rear as seen in the rotational direction, thus pushing the rolling elements 15, which were positioned there, out of this section and carrying along the two rolling elements 15, which then both operate in the middle section 16, without causing a blocking. The same applies in an analogous manner to a drive in the opposite direction.

If the drive is now stopped and a return force or a return torque is then applied to the output element 11, the output element 11 first rotates in the direction opposite to the drive relative to the drive element 10, until the control bars 18, which previously covered the outer sections 17, expose these outer sections 17. In this case, the rolling elements 15, which previously were located in the rear as seen in the rotational direction, move into these now-open outer sections 17, resulting in the wedging described above between the output element 11 and the bushing 9, such that a further return of the threaded spindle 4 is blocked, without also carrying along the drive element 10 or transferring a load in the direction of the drive motor or requiring such a load to be absorbed. This is also due to the fact that the driving protrusions 12 in such a wedging situation do not yet come to a stop at the side surface of the driving protrusions 13, which trailed during the driving in the previous rotational direction, but are free to move in the driving slots 13.

In the event that a driving operation is to be conducted again, this can be conducted in both directions, as the drive element 10 can be moved and as it covers the outer sections 17, in which the rolling elements 15 have been wedged, with the respective control bars 18, and pushes the rolling elements 15 out of these sections.

The special aspect of the return stop mechanism 6 described above is that it is free of additional movable control parts and also free of springs or other tensioning elements and is therefore simply designed with few parts, and is robust and durable in its function. The return stopping effect is nevertheless reliable and can absorb significant forces, in particular due to the fact that the distance between the surface of the output element 11 and the inner surface of the bushing 9 in the outer sections 17 decreases in a wedge shape, and a corresponding clamping effect increases with increasing forces and torques applied in a return direction.

The use of such a return stop mechanism allows for the use of drive motors 3 which are designed smaller and without their own or without a substantial own self-locking effect, and nevertheless have a sufficient locking effect against return forces or return torques acting upon the threaded spindle 4.

LIST OF REFERENCE NUMBERS

1 Spindle drive
2 Drive housing
3 Drive motor
4 Threaded spindle
5 Spindle nut
6 Return stop mechanism
7 Recess
8 Slot
9 Bushing
10 Drive element
11 Output element
12 Driving protrusion
13 Driving slot
14 Notch
15 Rolling element
16 Middle section
17 Outer section
18 Control bar

The invention claimed is:

1. A spindle drive, in particular for the motor-driven movement of louver elements of louvered windows or louvered shutters, said spindle drive comprising:
a threaded spindle that is driven in a rotary manner by a drive motor; and
a spindle nut which is in engagement with the threaded spindle and which is displaceable axially along the threaded spindle by rotating the threaded spindle;
a return stop mechanism arranged between a drive shaft of the drive motor and the threaded spindle, wherein the return stop mechanism includes:
a drive element; and
an output element;
wherein the drive element and the output element are arranged concentric to a rotational axis and are rotatable about this rotational axis relative to each other by an angular range within a guide surrounding one of the drive element and the output element, which guide has an internal surface having a circular cross-section which is located in a section plane perpendicular to the rotational axis, and which guide is also arranged concentrically to the rotational axis;
wherein at least one radially protruding driving protrusion is provided at a first of the drive element and the output element;
wherein a driving slot is provided in a second of the drive element and the output element;
wherein the driving protrusion protrudes into the driving slot;
wherein the driving slot, as seen in a circumferential direction relative to the rotational axis, has a slot width which is greater by a first value than a width of the driving protrusion in the circumferential direction;
wherein at least one notch is provided in the first of the drive element and the output element having the driving protrusion, in which notch at least one rolling element is arranged in a position in the notch between an inner surface of the guide and a surface of the second of the drive element and the output element having the driving slot;

wherein the first of the drive element and the output element having the driving protrusion has an extension of a second value, as measured from the driving protrusion to an edge of the notch facing the driving protrusion along the circumferential direction;

wherein the surface of the second of the drive element and the output element having the driving slot, in a region covered by the notch in a middle section in a plane transverse to the rotational axis, extends in the shape of a circular section concentrical to the extension of the inner surface of the guide, and in this region has a constant first distance to the inner surface of the guide, and wherein the surface of the second of the drive element and the output element having the driving slot has outer sections in the region covered by the notch, which outer sections are positioned on respective sides of the middle section as seen in the circumferential direction, in which the surface of the second of the drive element and the output element having the driving slot deviates from the circular extension and has a second distance to the inner surface of the guide, which is less than the first distance;

wherein the rolling elements have a roller diameter which is smaller than or the same size as the first distance, but larger than the second distance; and wherein the second value is selected such that the first of the drive element and the output element having the driving protrusion covers the outer section located adjacent to a side surface of the driving slot, which faces the edge of the notch, when the driving protrusion comes to a stop against said side surface.

2. The spindle drive according to claim 1, wherein the second distance in the outer sections decreases as the distance from the middle section increases.

3. The spindle drive according to claim 1, wherein regarding the drive element and the output element, radially protruding driving protrusions are provided on the first of the drive element and the output element and driving slots are provided on the second of the drive element and the output element, in each case in at least two positions offset in the circumferential direction, wherein the respective driving protrusions have identical dimensions and the respective driving slots have identical dimensions, and said driving protrusions and driving slots are arranged such that, in a first relative rotational position of the drive element and the output element, all driving protrusions come to a stop against first side surfaces, located on the left as seen in the rotational direction, of the corresponding driving slots, and in a second relative rotational position of the drive element and the output element, which is different from the first position, all driving protrusions come to a stop against second side surfaces, located on the right as seen in the rotational direction, of the corresponding driving slots, wherein the respective notches are provided in the respective regions in between the driving protrusions in the first of the drive element and the output element having the driving protrusions, and that at least one rolling element is arranged in each of the notches.

4. The spindle drive according to claim 1, wherein multiple rolling elements are provided in the at least one notch, and the multiple rolling elements are arranged side by side as seen in the circumferential direction.

5. The spindle drive according to claim 1, wherein the threaded spindle is firmly connected to the output element and in the driven state rotates about the rotational axis.

6. The spindle drive according to claim 1, wherein the region of the surface of the second of the drive element and the output element having the driving slot, which is covered by the notch, has a form symmetrical to a central axis, as seen in a cross-section plane perpendicular to the rotational axis.

7. A louvered window or a louvered shutter having louver elements arranged rotatably about parallel rotational axes in a shared frame and having a drive gear having a pushing element connected to the louver elements for converting a longitudinal movement into rotational movements of the louver elements about their rotational axes, wherein the louvered window or the louvered shutter has a spindle drive according to claim 1, the spindle nut of which is coupled with the pushing element for driving the pushing element.

8. The spindle drive according to claim 3, wherein regarding the drive element and the output element, the radially protruding driving protrusions are provided on the first of the drive element and the output element and driving slots are provided on the second of the drive element and the output element, and in each case in exactly three positions offset in the circumferential direction.

9. The spindle drive according to claim 4, wherein two rolling elements are provided in the at least one notch.

10. The spindle drive according to claim 5, wherein the threaded spindle is integrally formed with the output element.

* * * * *